United States Patent
Dort

(10) Patent No.: US 7,991,681 B2
(45) Date of Patent: Aug. 2, 2011

(54) COMPUTER-BASED VIRTUAL PERSONAL ECONOMIES IMPLEMENTED OVER PUBLIC AND PRIVATE NETWORKS AND METHODS FOR CONFIGURATION, USE AND POOLING OF SAME

(75) Inventor: David Bogart Dort, Washington, DC (US)

(73) Assignee: Vrbia, Inc., Alexandria, VA (US)

( * ) Notice: Subject to any disclaimer, the term of this patent is extended or adjusted under 35 U.S.C. 154(b) by 1714 days.

(21) Appl. No.: 10/710,856

(22) Filed: Aug. 8, 2004

(65) Prior Publication Data

US 2006/0041495 A1 Feb. 23, 2006

Related U.S. Application Data

(60) Provisional application No. 60/591,129, filed on Jul. 26, 2004.

(51) Int. Cl.
*G06Q 40/00* (2006.01)
(52) U.S. Cl. .......................................................... 705/37
(58) Field of Classification Search .............. 705/35–37; 902/8–21; 434/110
See application file for complete search history.

(56) References Cited

U.S. PATENT DOCUMENTS

| | | | | |
|---|---|---|---|---|
| 5,499,295 A | * | 3/1996 | Cooper | 380/270 |
| 5,878,138 A | * | 3/1999 | Yacobi | 705/69 |
| 7,104,443 B1 | * | 9/2006 | Paul et al. | 235/380 |
| 2002/0052788 A1 | * | 5/2002 | Perkes et al. | 705/14 |

OTHER PUBLICATIONS

Shy, et al., "The Market for Electronic Cash Cards", Journal of Money, Credit & Bank, 34, 2, 299(16), May 2002.*

* cited by examiner

*Primary Examiner* — Mary Cheung
(74) *Attorney, Agent, or Firm* — David Dort

(57) ABSTRACT

In one mode the present invention allows for transactions of various types to take place "anonymously" and securely over public (WAN), semi-public (e.g. AOL) and private or subscription networks and without regard or dependency to currency valuations or per se financial institutional policy. The present invention in another mode allows individuals or groups to "attract" investors anonymously over the network in their own asset holdings or even their asset building or acquisition plans, making each individual or pooled group capable of becoming their own "IPO."

6 Claims, 16 Drawing Sheets

COMPUTER-BASED VIRTUAL PERSONAL ECONOMIES IMPLEMENTED OVER PUBLIC AND PRIVATE NETWORKS AND METHODS FOR CONFIGURATION, USE AND POOLING OF SAME

REFERENCE TO PRIORITY DOCUMENTS

This Application claims priority under 35 USC §119(e) to U.S. Provisional Application Ser. No. 60/591,129 entitled Computer-Based Virtual Personal Economies Implemented over Public and Private Networks and Methods for Configuration, Use and Pooling Same, filed on Jul. 26, 2004.

BACKGROUND ART

Electronic financial transactions are ubiquitous, from both personal and institutional viewpoints. Securing and trading of commodities in the international private banking and trading sectors require that the forefront of computer and network security be constantly evolving at a rapid technological pace. A good discussion of the meta-technical issues involving web-based electronic businesses is provided by the collection of articles in *Architectural Issues of Web-Enabled Electronic Businesses* (Idea Group, 2003) edited by Shi and Murthy, which is incorporated herein by reference.

In a simplified form, the electronic transaction space of the electronic auction, such as E-bay may represent a primitive and fully moderated form of Stephenson's vision. The modern electronic auction may be conducted in near-real-time or any number of variations. A detailed review of the electronic transaction environment is discussed in the texts *Digital Dealing: How E-Markets are Transforming the Economy* (Norton, 2002) by Robert E. Hall and *The Future of E-Markets* (Cambridge University Press, 2001) by Martin Bichler. These two texts are hereby incorporated by reference herein. FIG. 1 is a representation a series of transactions in an electronic environment of personal or corporate electronic transaction/auction, which many entities exist in various electronic transactional representational formats.

The direction that the ubiquitous electronic transaction will take our individual and corporate transactions and wealth is unpredictable. Currency transactions appear to be less relevant as multi-national units appear, such as the Euro, although there does not appear to be an international drive towards a universal currency, as evidenced by the problems in implementing the "euro" across western Europe. In the classic science fiction novel, *Snow Crash* (Bantam 2000) author Neal Stephenson depicts a "cyberspace" in which entire economies exist in an electronic world in which persons, business, and governments are represented by "avatars" or representations that are electronic "alter-egos" of the entity in question. This is shown by the illustration in FIG. 2 in which "virtual transactional space" is represented in a sample transaction. This concept has been exploited by other science-fiction authors in such fiction books as *The Neuromancer Trilogy* (1984) by William Gibson (software representations of personalities and are capable of bargaining long after the actual person had died), *The Diamond Age* (1999) by Stephenson (taxation is no longer possible because governments cannot effectively tax virtual transactions). Yet, electronic transactions can be monitored by specialized chips ("snooper chips" has been proposed) and tracing and freezing the assets of a rogue or unlawful organization has never been easier. It is unclear whether the pervasiveness of the electronic transaction will give us more privacy from government and/or licit or illicit information seekers or less.

As early the 1970s, science fiction author Arthur C. Clarke depicted a scenario in which the world's economy could be "electronically frozen" due to a widespread panic coupled with a series of major bank computer malfunctions. The depiction was that it took so long to undo all the electronic accounts to determine that the major global economies have virtually collapsed.

Clarke's depiction of widespread economic chaos due to a chain reaction series of electronic malfunctions may be far-fetched, but the concern was real when many technicians thought that the embedded code in many older financial transactional system could have raised real headaches during "Y2K" crisis, which never materialized in any significant manner. However, more severe is the unsettling of mid-sized national economies (such as Argentina in 2001 or pacific rim countries in 1997) due to political or economic crises or improper or later interventions by stabilizing institutions. However, these devaluations/collapses have not spread to the larger stable economies of the G8. Alternately, large financial institutions may provide their own stable "currency" and provide some security though their assets in securing transactions between parties or investments. However, these entities are governed try natural laws and subject to currency fluctuations or national economic collapses and cannot guarantee the stability of their security.

DISCLOSURE OF INVENTION

In order to provide individual (personal and corporate) traders, investors and securitors (including guarantors) with an alternative to fluctuating currency valuations and concerns, in one mode the present invention allows for transactions of various types to take place "anonymously" and securely over public (WAN), semi-public (e.g. AOL) and private or subscription networks and without regard or dependency to currency valuations or per se financial institutional policy. The present invention in another mode allows individuals or groups to "attract" investors anonymously over the network in their own asset holdings or even their asset building or acquisition plans, making each individual or pooled group of individuals capable of becoming their own private "IPO."

The present invention optionally includes a "semi-anonymous" unique asset classification and identification system. The classification or identification of assets in the present invention may be identified by standardized type and history with revealing the exact identification and is partially identified in the transactional mode for valuator or investment in a "transactional space." The other part of the asset identification may be authenticated by a trusted source or authentication module acting independently or as a subscription service.

An entity looking to exchange assets or commodities may use the predefined groups of assets for valuation and securitization purposes. Thus, the present invention takes advantage of a connectivity of assets through a computational network without reference to standard currency valuation and can dispose (transaction, investment, etc.) of a desired asset or commodity through the networked intermediate assets defined in the transactional space(s).

BRIEF DESCRIPTION OF THE DRAWINGS

Certain embodiments of the invention may be better understood by reference to the following illustrative and representation drawings in which.

MODE FOR THE INVENTION

In order to illustrate the various embodiments of the invention, some of the lexicographical terms that are specific to the teachings contained in the present invention will be noted in bold text, and descriptions of specific illustrative assets will be in "italicized bold text."

The present invention contemplates at least several different implementations in the virtual or electronic transactional space. The discussion below illustrates that the present invention can used differently by different end users in multiple modes. The valuation mode allows for transactions to be valued, secured, and exchanged without reference to a particular currency (or any currency). The second main mode of the virtual personal economy is an investment or attraction mode which allows individuals or groups to attract investment independent of institutional valuation and without regard to a particular currency. Other types of modes, such as the transactional entity enhanced transaction mode will be discussed also.

Figure 3:
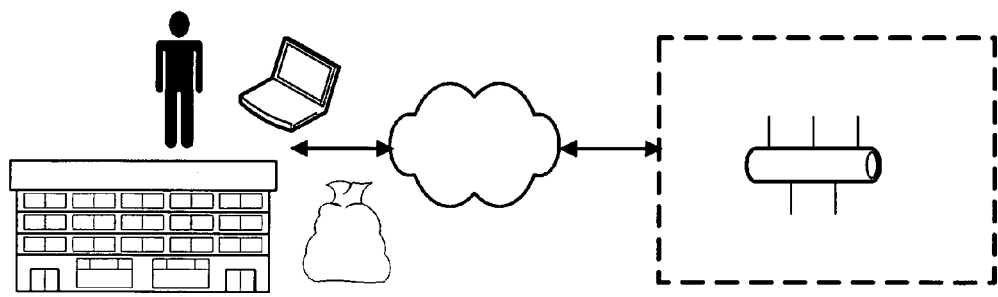
FIG. 3 shows a sample block diagram of a simplified embodiment of the invention and an transactional environment.

Now referring to FIG. 3, the invention shown in a first embodiment in a virtual personal economy or VPE. The VPE may be configured in several different ways. Firstly, the VPE host may act as a valuator or securitor in an electronically requested exchange of commodities. The VPE host, whether individual or group, imports or exports and can valuate their existence of the (each) VPE and allow entities to value (valuation) and/or guarantee or secure each commodity in the transaction or valuation, based on the VPE(s).

FIG. 3 shows that the VPE is hosted on a computation device 51 that exists inside or "adjacent" to a (electronic and networked) transaction space TS, and may include any number of devices containing standard or customized processors and appropriate I/O interfaces (not shown). However, in a preferred embodiment, the computation device 51, includes at least one standard processor, such as a PC or microcomputer processor, and a customized processor, which will be described in detail below. The computation device 51 also includes a VPE module or virtual personal economy module (herein VPE). The computation device 51 may accommodate any number of VPE modules, whether in virtual form or in physical form such as an Application Specific Integrated Circuit (ASIC), discussed below. The multiple-VPE or meta virtual personal economy systems will be noted herein as mVPEs, and it is expected that many of the advantages of particular embodiments will be enhanced by the multiple configurations that lead to different type of valuations and functions taking full advantage of the mVPE leverage.

Figure 1:
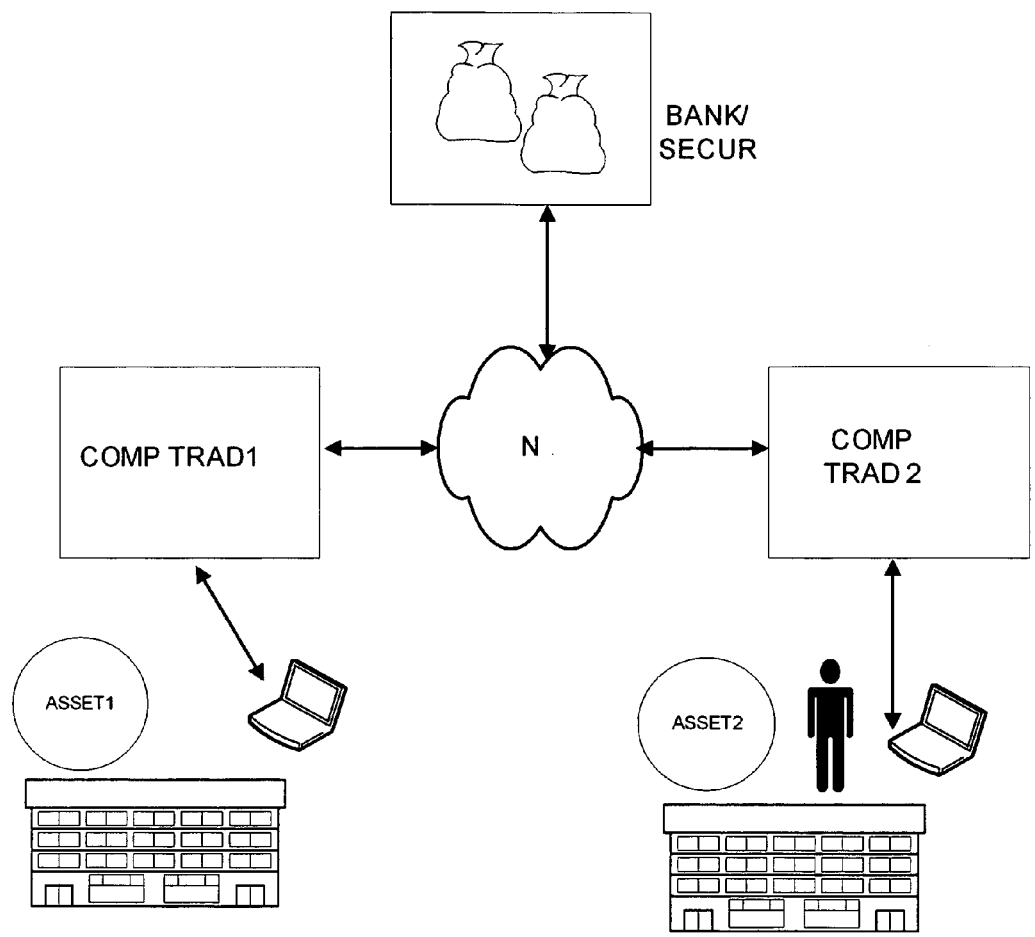
FIG. 1 shows a sample electronic transaction in a virtual marketplace as a near-real-time alpha text based experience.
Figure 2:
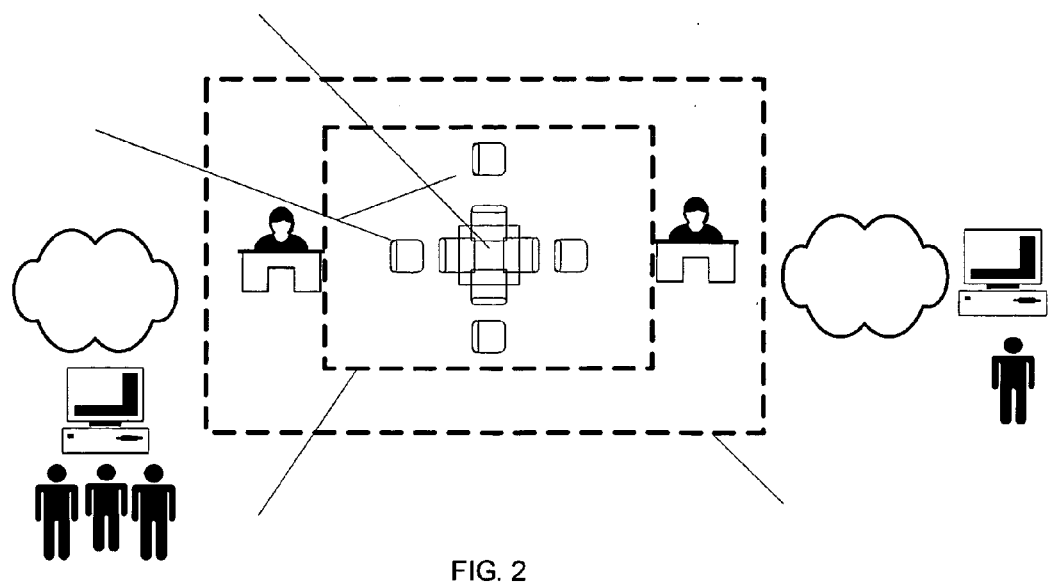
FIG. 2 shows a sample electronic bargaining parties in a virtual transactional space or cyberspace electronic transaction environment.

The transaction space TS may encompass the computation device 51 and also optionally include the connection to the network NET. The network NET will take on many different forms, but is a wide area network (WAN) in a preferred embodiment. As shown in FIG. 2, the transactional space TS may actually occur on a networked device apart from the invention. However, for the sake of illustration, the transactional space TS will be shown as part of the VPE or mVPE or should implicitly be understood to exist in between the transactors (in a valuation/securitor mode) or investor (in attraction mode), the VPE system and a network. These concepts will be illustrated in the particular features of the embodiments discussed below.

Figure 4:
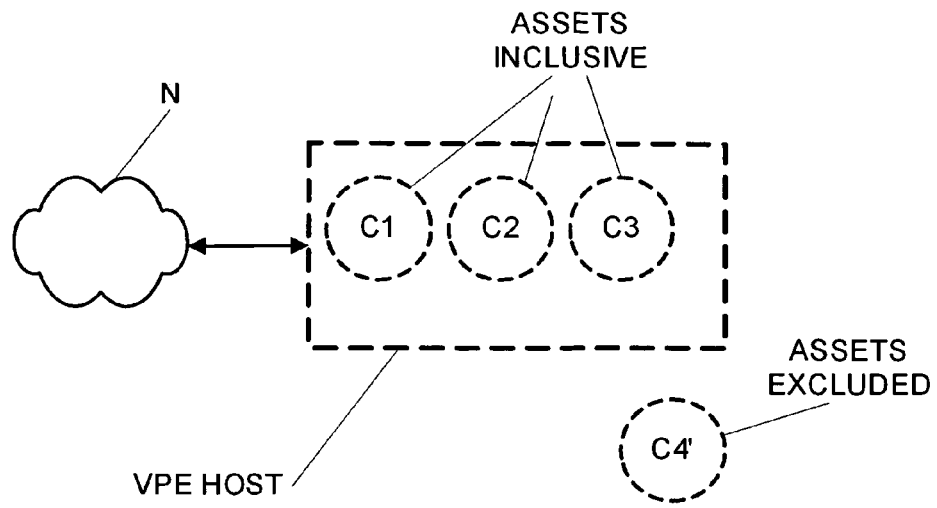
FIG. 4 illustrates an embodiment of the invention in which a single VPE host is defined by included assets as well as an excluded asset.

Now referring to FIG. 4, a VPE host includes options to include any or all of three particular VPE assets (which may be included or excluded on a contingent bases, based on a transactional rule) or identifiable valuations C1, C2 and C3. The VPE can include various types of leveraged or intangible assets, such as options, futures, rights, etc. For example, C1 may be the rights to the asset "40 acres harvest of soybeans in a county in the southern US from years 2005-2008." (specific examples not given). The identification labeling of individual commodities for assets C1-C3 to maintain computational and transactional integrity in the asset pool will be discussed later, but is not necessary to implement all embodiments of the invention. However, in a preferred embodiment, an (partially) anonymous asset classification and identification system, in which the "asset DNA," discussed below in FIGS. 20A-D and FIG. 21, makes implementing the virtual personal economies much more efficient.

Asset C2 may be illustratively defined as a more personal asset that may not normally be used in an economic exchange, such as the "partial" commodity future defined as C1, above. For illustrative purposes, C2 in this case, is a valuable license, such as a "medallion" for a taxi operation in New York City (yellow cab medallion). Similarly, C3 may be defined viz-a-viz assets C1 and C2 and be a "typical" asset, or, contrastingly, a personal type of asset, like a valuable object, making up the balance of the VPE. This sample virtual personal economy is made up of three assets of differing variety, which may be desirable under certain circumstance and less so in other types of circumstance.

Each of the VPEs does not necessarily have to include only "static assets," but may include many types of dynamically exchanged or valuated assets. These may include rights obtained that have value in the virtual personal economy, but may not have value (for regulatory or other reasons) in the tradition equity or futures exchanges, as well as being unwieldy for a traditional electronic auction environment. For example, a particular VPE may include the rights to reserve a keyword on a major search engine such as Yahoo® or Google®, where those keywords are particularly valuable at a particular temporal window. For example, rights acquired on a particularly high-volume seasonal shopping like Valentine's Day (the rights are from, and the asset holder AH has rights to the keyword "flowers" meaning that the value of the asset in the VPE would be highly dynamic and generally related to when the keywords rights were to be auctioned. As a result, the value would spike sharply towards the target date. Other dynamically-valued assets would have their value contingent on other factors, such as geography, political events, commodity shifts, market reports and so on.

Figure 13:
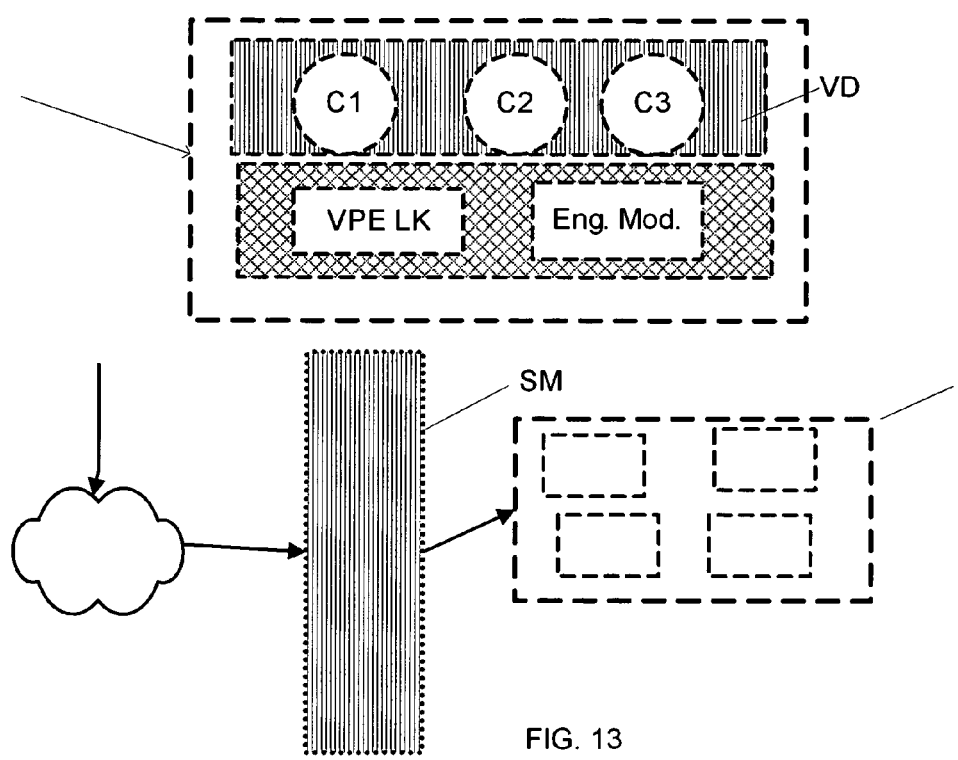
FIG. 13 shows a subscription module used to access the transactional space.

Each mVPE (see above discussion) may be part of another VPE or mVPE's in that in particular embodiments of the invention, mVPEs may be a so-called "loose collective" of individuals or one or more institutions, only organized by the VPE host, or, in the alternative, the transactor in any given transaction may wish to choose a specific VPE, series of VPEs, or an mVPE. In any event, in alternate embodiments, the transactor may choose any side of the VPE which is made available by the mVPE or the host. Along these lines, certain VPEs may not be included individually in the configuration of the particular mVPE requested in a transaction, but the excluded VPEs can be included in the overall economic or valuation power (and get the resulting reward for assisting in the securing of the currency-less transaction, see the discussion in FIGS. 13 and 18, for subscription service-based VPE services).

Each VPE (and therefore each mVPE configured) may be used in one of many modes or combinations of modes (there are four disclosed in this application). However, the VPEs/mVPEs will not generally be used in different modes at the same time. For example, the attraction mode available in the present invention allows each individual VPE/mVPE (as an individual or as a collective) to essentially be their own initial public offering (IPO). This is called attraction or investment mode and essentially allows any people using this particular embodiment of the claimed invention attract investment, in their attraction target or attraction mode VPE-A. However, this may not be desirable for all users of the virtual personal economy system, particular those who are seeking to capitalize and profit of off of the desirable securitization properties of their assets, for example, a particularly stable asset, such as platinum bullion, may be sought out and generate significant securitization fees.

Although an object of the present invention is to avoid the use of any governmental currency per se, to value assets, which are: 1) attracting investment or 2) being used as security or valuation (depending on the mode used the invention), if currency is part of the definition of the asset, the currency element should be included in the description and/or the asset identification system detailed below in FIGS. 20A-C and FIG. 21.

Figure 5:
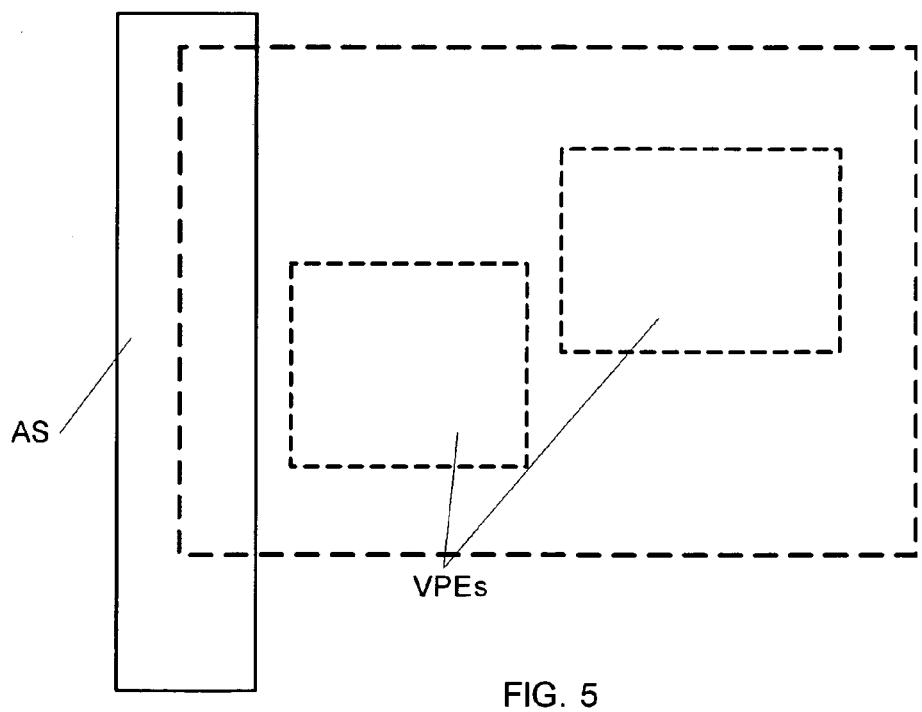
FIG. 5 illustrates a VPE transactional space with an authentication gate or service.

Referring now to FIG. 5, a representation of the invention is shown in which an authentication module or authentication server AS serves as the gateway or security entrance to the transaction space TS. Thus, a user of the VPE must enter through a security system implemented over the network, further security measures will be discussed in detail below, but in general, the authentication server AS will implement all necessary features such as cryptographic techniques, biometric security measures (if relevant), RFID measures, e-mail authentication, or other techniques.

Figure 6:
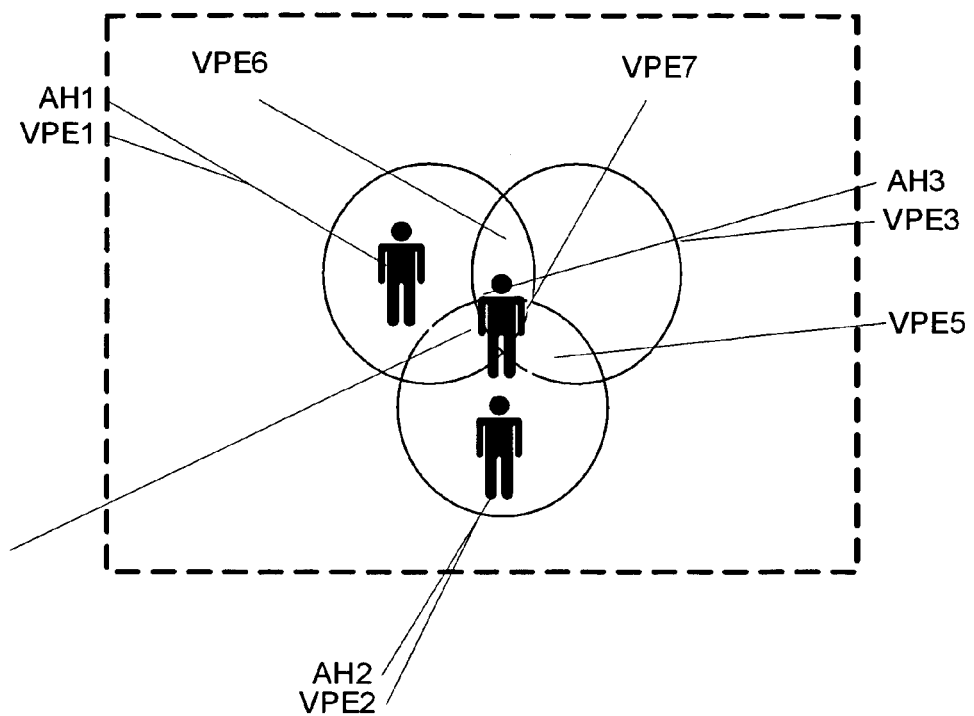
FIG. 6 illustrates a meta-virtual personal economy (mVPE) with multiple configurations.

The present invention may take various embodiments, however, the reconfigurability of each set of assets in a mVPE is a particular advantage and can only be computationally accomplished through a powerful processor in the computation device or multiple computation devices (such as 51 shown in FIG. 3). As shown in FIG. 6, a series of single virtual personal economies VPE1-VPE7 is illustrated. In this illustration, the VPEs are actually permutations of three individual asset holders and the associated assets AH1-AH3, which also correspond to VPE1-VPE3, respectively, and which are shown in the respective Venn diagram elements. Therefore, FIG. 6 shows at least seven different VPE configurations, resulting from the three asset holders AH1-AH3. Where AH1 meets AH3 virtual personal economy number six or VPE6 is formed. Likewise, where AH2 meets AH3, VPE5 is shown. Where all three asset holders have pooled the assets virtual personal economy number seven VPE7 is formed. The various VPE configurations can be implemented based on a set of rules based on the type of transaction, market conditions for asset classes, reliability and creditworthiness of individual asset holders, fluctuations in economies or by specific or general request of a transactor or a securitor.

Figure 7A:
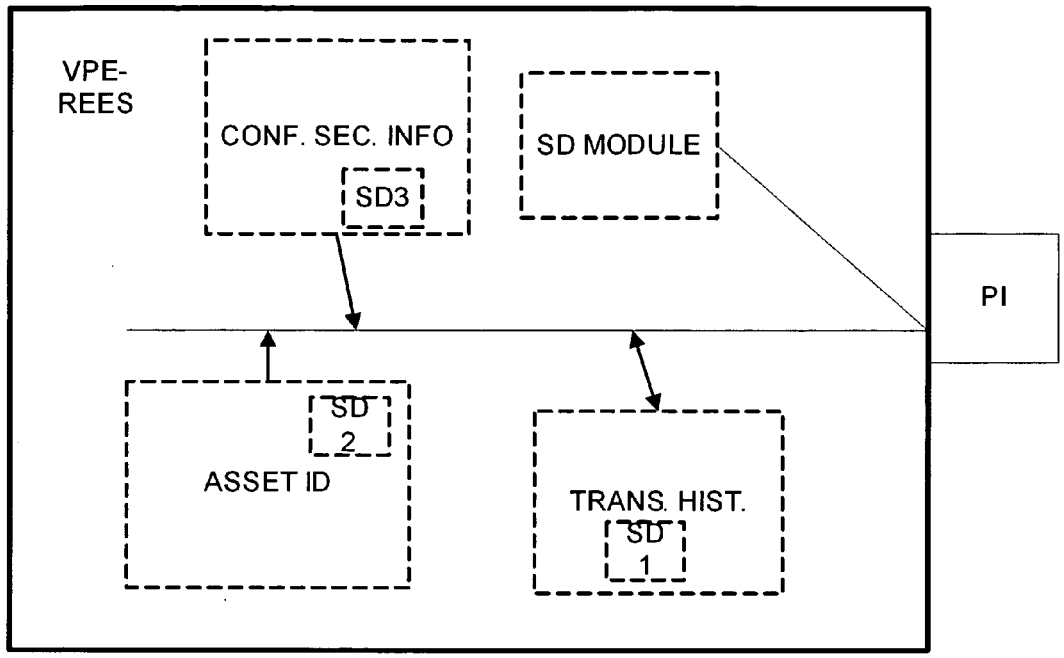
FIG. 7A illustrates the data architecture for electronic storage and retrieval.

Referring now to FIG. 7A, virtual personal economy host may take the form of removable encoded electronic storage VPE-REES. The removable storage device VPE-REES may be a modified USB solid-state flash drive (64 MB is available for $19.99), a compact flash, smart media card, or other available removable secure memory. The main features is that the solid-state media should be modified such that certain information is not removable once it has been "burned" to memory, such as the configured security data which cannot be overwritten and which only flows out. Similarly, the asset information data should not be reconfigurable and information should only flow in one direction out of the VPE-REES. The transaction history, however, may include all types of information regarding the use history of the VPE-REES and receives data from each transaction. An optional self-destruct module (SD Module) can be programmed to destroy the entire device on a particular schedule, such as expiration, or upon the detection of a particular event, such as the attempt to tamper with the asset or configured security data, or another illicit use of the highly valuable information in the VPE-REES. The self-destruct module (SD module) can be configured to capture the essential data for reconstructing, yet shut down any access to the internal bus (IB) that would allow an (illicit) user to misuse the data. The self-destruct module SDm will automatically activate if there is an attempt to reprogram or bypass it. The data may be reconstructed by a specialized computation machine (not shown) that is accessible only to authorized persons or computers. The specialized detection, shut down, data capture and reconstruction may be more easily accomplished by an optional at least second portion of the self-destruction module on the other data/memory sections, shown as SDM1 (asset data), SDM2 (transaction histories), and SDM3 (configured security). Possible implementations of the self-destruction module are discussed below.

It is contemplated that the memory requirements of the VPE will not be so prohibitive that replacing the VPE-REES is a problem. Thus, in a preferred embodiment, every asset change in the VPE or security change will necessitate a replacement VPE-REES.

Figure 7B:
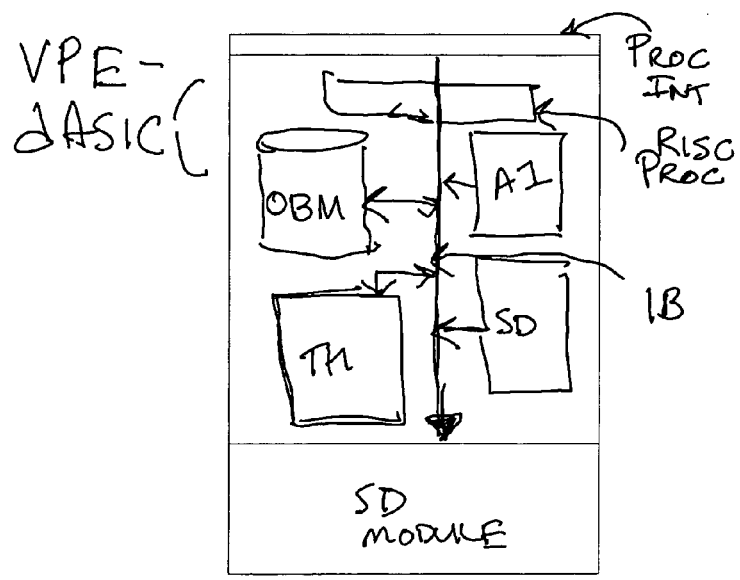
FIG. 7B represents a possible data architecture of a preferred embodiment of the invention as it may be partially implemented on an Application Specific Integrated Circuit.
Figure 8:
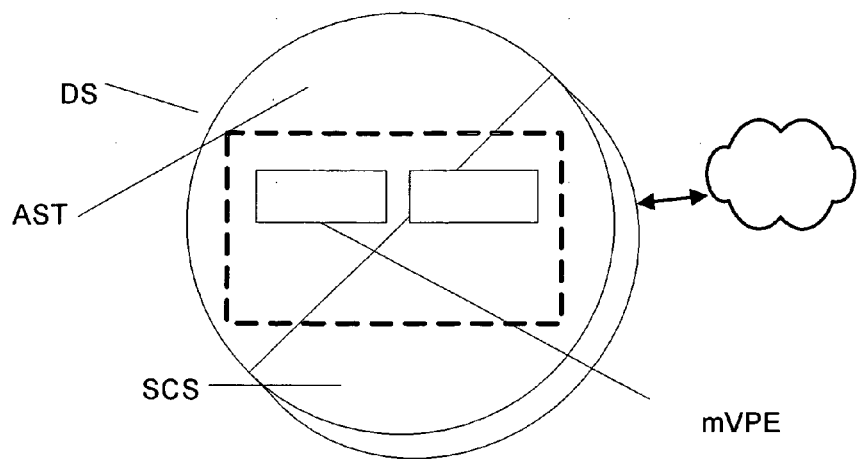
FIG. 8 shows a representational date storage space for the mVPE.

FIG. 7B shows a sample architecture of a dedicated application specific integrated circuit (VPE-dASIC) for use in an embodiment of the present invention, which would have similar features of the removable module. Obviously, the access to the VPE-dASIC would be much more limited and subject to the rules of the computational device (See FIG. 3, reference 51) in which it was installed. A specialized processor SP which can be a configured 16 or 32 bit specialty processor can reconfigure the necessary sections, particularly if the VPE-dASIC has a on-board memory. Replacing the VPE-dASIC would be more difficult than the VPE-REES, so various rules may be implemented about the necessary changes required. It is possible that Referring now to FIG. 8, a simplified representation of a VPE/mVPE on a data storage device. DSD, is shown. In a preferred embodiment, the invention will have both accessible AST and inaccessible storage SCS. By inaccessible, it is meant that a standard user or asset holder would not be able to access the data without special conditions. The secure or inaccessible data storage is shown as the dark region of the data storage. The light region of the data storage is the accessible portion AST and/or the reconfigurable portion that may act as a dynamic securitor or attractor. The inaccessible portion SCS, will contain the more "permanent data" aspects of each asset involved in the virtual personal economy. Optionally, it will also include the unique asset identifier, which will be discussed at length below. The permanent data aspects may also be implemented on the specialized ASIC discussed above in FIG. 7B (VPE-dASIC).

Figure 9:
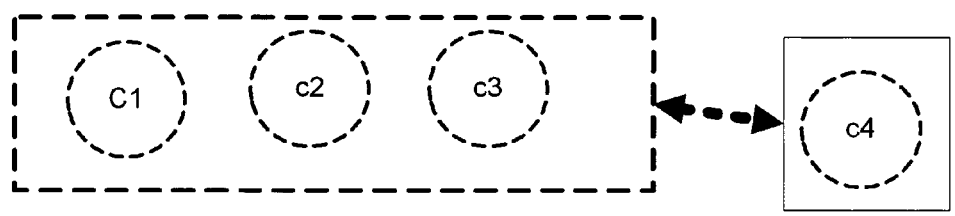
FIG. 9 illustrates the exchange of commodities within a VPE.

Referring now to FIG. 9, a representational asset link is shown. A virtual personal economy VPE holds three assets C1, C2 and C3. However, under particular conditions, either one of two of the following scenarios is the case. First, the value—one or more of the assets C1-C3, is dependent upon value or conditions present in (excluded) asset C4, and/or secondly, asset C4 is included in the virtual personal economy only under particular conditions. For example, if a transaction has to be secured over a holiday, C4 may represent an asset that does not fluctuate when markets are not in session.

The general architectural and functional principles of the invention have been described above, thus there has been a dearth of detail regarding specific or specialized modes for particular embodiments of the invention. FIGS. 10-15 represent particular embodiments of the present invention as contemplated in a first or securitization and valuation mode. The virtual personal economies in this mode are designated VPE-S or mVPE-S.

Figure 10:
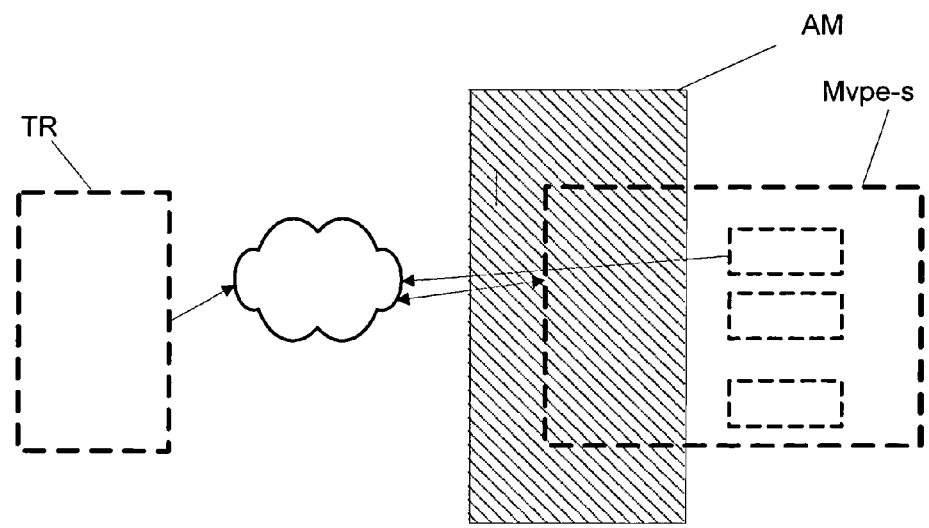
FIG. 10 illustrates a functioning embodiment in the transaction/valuation mode with an authentication module.

Referring now to FIG. 10, particular implementations of a preferred embodiment of invention are shown as they may be used in the electronic transaction marketplace. FIG. 10 shows a semi—private transaction system, where a transactor TR contacts a broker or agent through a network N which in turn contacts the mVPE-S through an authentication module AM. The authentication module AM serves as both a screener and security for the transactor and securitor. The authentication module AM can also act as an interceptor looking to make sure that all transactions that are relevant to its associated VPE is mVPE's or sets of mVPE's are routed to the correct computational device. The authentication module AM can also serve as a screening mechanism or device for a public or semi public system in which the transactor TR or is looking through public channels such as a wide area network (or other type of WAN) or the Internet.

The authentication module AM can also serve as a login/security gate for a subscription or membership transactional space system in which selling and receiving transactors, as well as the determination whether those seeking to use the services provided by the mVPE's are members or have paid for the one-time use.

Figure 11:
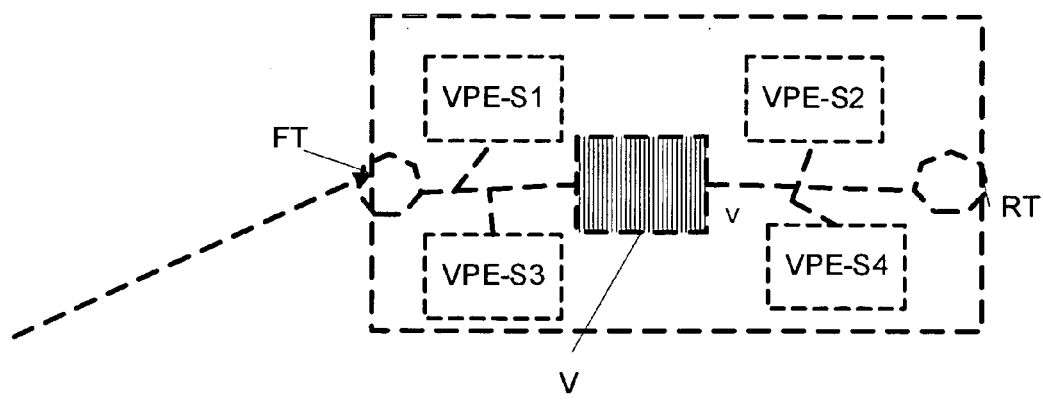
FIG. 11 illustrates a sample transactional path within an mVPE.

Referring now to FIG. 11, a sample internal transaction/valuation mVPE-S as may be implemented in the present invention. A transaction may enter in the "front end," (e.g. a first party requesting) or the "reverse end" of the mVPE-S. The transaction is then interpreted by the front or reverse rule modules FT or RT, respectively in the one or computational devices (not shown) making up the mVPE-S. The internal link structure ILS either physically and/or virtually connects the VPE-S devices (shown as VPE-S1-4) to the rule modules and the valuation module V. The rules modules FT and RT can request any of the VPEs to participate in the valuation and securitization of a transaction.

Figure 12:
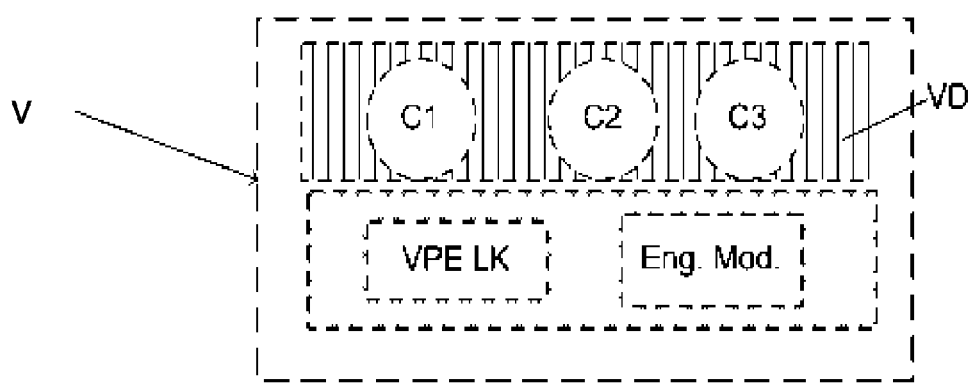
FIG. 12 shows a valuation module in a first embodiment.

FIG. 12 shows the sample virtual structure of a Valuation module V. The Valuation module has valuation "duplicate" or phantom representation of a VPE-S with 3 assets C1-C3 that are placed in the valuation module through the VPE link. For example, a transaction for commodities A and B indicate that the rule modules FT/RT need to invoke only a single VPE-S with assets C1-C3. The engagement module EM, ties the three assets C1-C3 to the appropriate verification system which may include any number of networked and computational parameters, but will be discussed below. The subscription module SM shown in FIG. 13 and may be a number of public, semi-private, or privately accessed networked modules.

Figure 14:
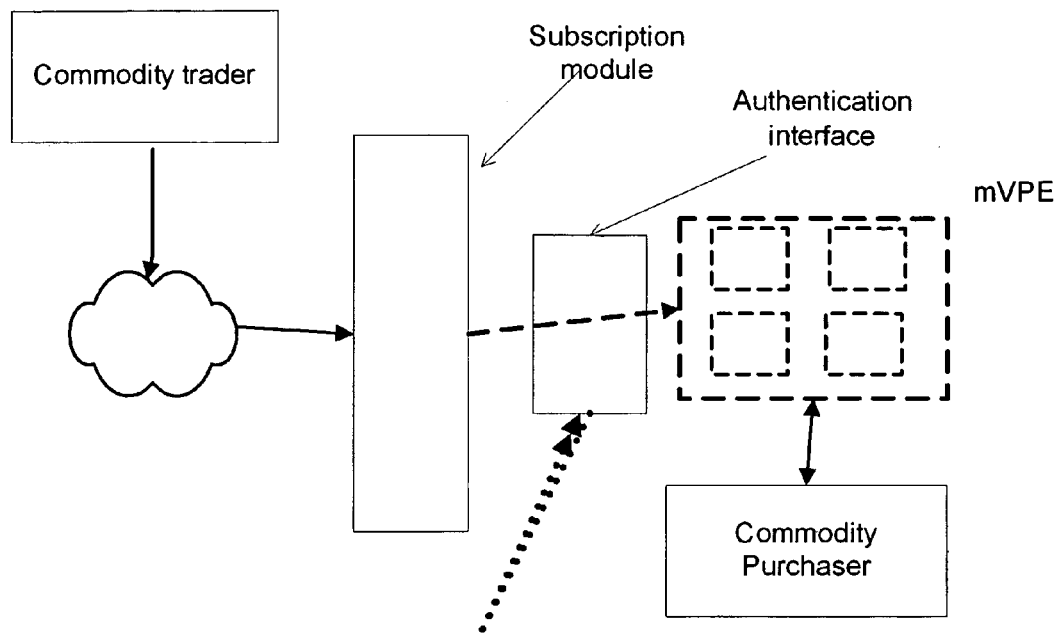
FIG. 14 illustrates a preferred embodiment of the invention in the valuation mode with a subscription access system and an authentication interface.

A preferred embodiment of the first mode or transaction/securitization mode is shown in FIG. 14. The preferred embodiment includes both the authentication module AM and subscription module SM for regulating and monitoring the transactional requests between parties looking for an exchange (shown as a commodity purchaser and trader, but can three and multi-party transactions in alternate embodiments). The subscription module SM regulates access to the private, and semi-private transaction systems (although a per transaction basis fee system may be available if the proper infrastructure is in place). The subscription module SM is also implemented based on the assumption that the present invention is a novel business method and income stream as well.

Figure 15:
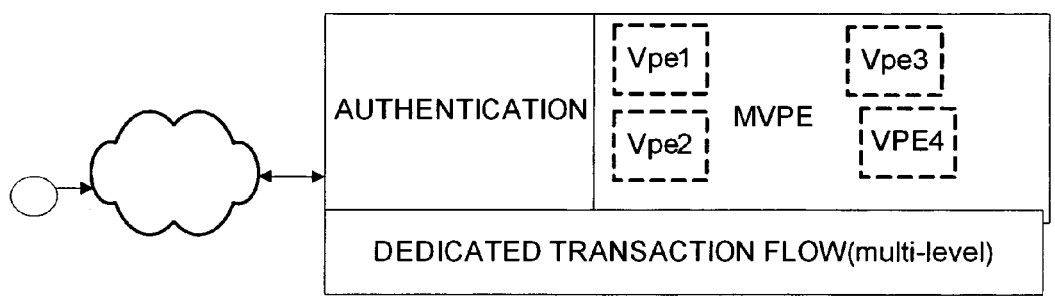
FIG. 15 shows the invention with a dedicated transaction flow.
Figure 16:
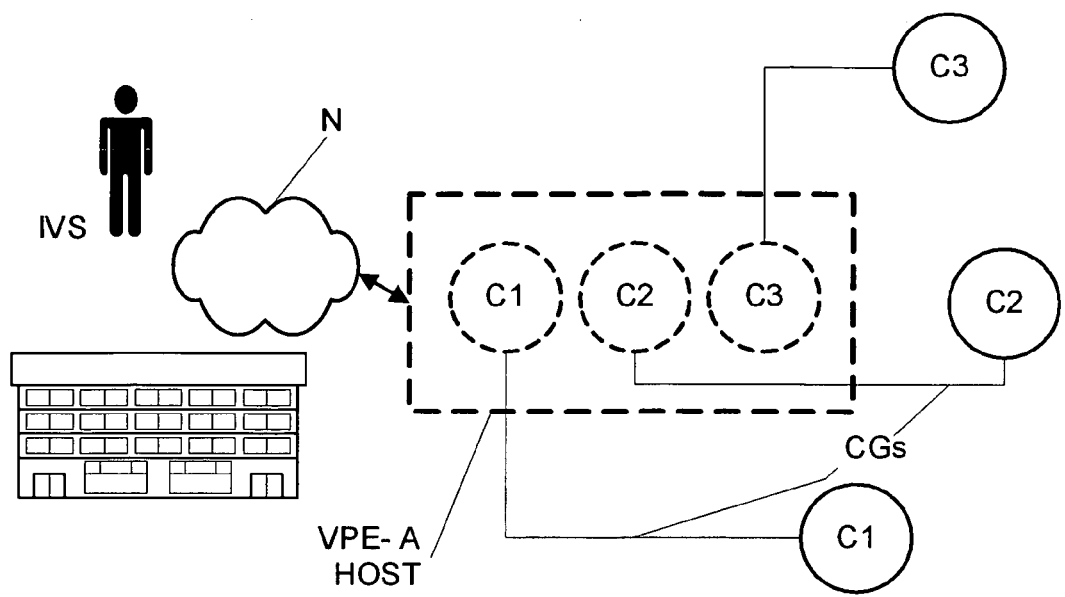
FIG. 16 illustrates a system for implementing the invention in the investment attraction mode.

Now referring to FIG. 15, a sample transaction flow (labeled) in the mVPE-S system is shown. The dedicated transaction flow protects the mVPE from outside tampering and in the illustration requires that all data coming out of the mVPE channel through the authentication system. In this embodiment, the authentication can service many different mVPE systems or can serve in a singular capacity, but allow data to flow freely within the mVPE so as not to weigh the computational processes required inside, but protecting and authenticating all data flowing to and from the mVPE. The dedicated transaction flow may have multiple levels of security or access for varying degrees of transactions.

When a investor seeks a VPE in attraction mode (VPE-A), the investor is not necessarily putting US dollars or any other kind of currency in an account or an escrow, like the tradition exchange involved in an investment. Although the invention covers such systems which is more of a cut in two, a mass asset borrowing system or capital generating system each investor either individually or in a pool may exchange and investment off assets and in asset pool. The assets presented in the investors asset pool may be granted as a number off predefined units as discussed above these predefined units are dependent on the perceived value of a pool of the VPEs and the investor through a computing device IVR, who has static assets may wish to another and an attraction the VPE with dynamic assets lost the through the exchange mechanism either by pool, obstruction, solicitation, specific invitation, lottery, random assignment, or other contemplated exchange mode (e.g. auctions), the two assets may be linked independently of any current evaluation system. For example in the FIGS. 17A and B, the rights or at the deed to a piece of undeveloped property in his VPE attraction property in the investors equals assets ratios of 1:15 (in the VPE attraction mode as the valuation in securitor mode may be different) on a specific date, and/or alternately, in a specific context.

The attraction mode in the VPE system allows for all types of bargaining and exchange of assets or allocation of assets for investment. For example, the attractor VPE does not want to own only dynamic information-based assets, but wishes to keep most of them a simple diversification with at least part of it invested as a portion or all of C1 through C4, which are information-based rights that have time-sensitive valuation features. In the attraction the VPE may enter the transactional commodity transactional VPE mode. However, the advantage of the VPE is that attraction of investment does not require the use of another mode, and simply may accumulate value by investment association, independent of any currency.

It is contemplated that currency may keep arts of the asset pool but will not define the value all of the asset pool either of the investor or the attractor or the "transactors."

The invention is particularly useful in those situations where a currency devaluation or destabilization may not be appropriate or beneficial. Valuations or securitization secure transactions may be guaranteed to the benefit of all parties live virtual personal economies acting as the guarantor to the transactions.

For example, a broker is looking to exchange commodity one for commodity to blood is on for many are with you to be in possession of commodity to broker who can enter the transactions space either through subscription or access membership enters the network looking for a seller of commodity to. Commodity to holder is part of A. virtual personal economy in the subscription network however no one in C2 is all not no one who holds commodity C2 is familiar with the broker or the holder of C1 and as a willing to exchange money based in currency for. The transactions space includes a guarantor virtual personal economy or linking and evaluating via virtual personal economy. The evaluating or late in VPE may or may not be part all in authentication at work or private authentication network but maybe for many are to both of the broker of commodity one in the seller of commodity to exchange commodity one is that links to A. the asset pool or portion asset pool or a standard are normalized part of that asset pool in the guarantor evaluating the VPE.

One of the advantages of the present invention, in addition to being independent of currency fluctuations and political upheavals, is that taxation is difficult to ascertain for exchanges of commodities, and they bought a possible science, that do not easily translate into dollar or a correlated value. While it is not contemplated that the present invention is to be implemented to avoid the pain of taxes, it is one of the objects of the present invention to facilitate the free exchange of assets and asset classes, which would normally be difficult to value or classify based on traditional factors.

FIGS. 16-19 relate specifically to the second contemplated mode or embodiment of the invention in which the VPE may include one or more other portions that act as a personal asset investment attraction (IA). An individual may wish to have virtual personal economies configured for different scenarios, including allow others to "invest" or tie their valuable assets to their (pledge for exchange, a guarantee bank of assets, etc). For example, an individual with a VPE of assets C1-C3, in a transaction mode, may want to include asset C4 in investment attraction mode. One of the reasons that a VPE owner may not want to guarantee, but to allow investment from an asset is due to the fact that they may not wish to risk losing asset C4 or having it devalued in the event of a failed transaction costs. (If C4 is excluded a virtual personal economy of one mode includes C1-C3, but not for however the other, the assets may increase in value due to the fact that they are in a guarantor valuation mode VPE, and therefore entitled to the percentage of many deals for which they serve in that capacity).

Additionally, while assets C1, C2 and C3 may be worth "one Rolex today" over the course of a specified amount of time they may be worth "1.5 Rolexes" simply by virtue of being able to guarantee the Rolex exchange. Thus, the property/asset investor VPE-owner would find that their property is now worth 1.5 times as much as before, but still worth the same as C4 in an exchange for that investment.

Valuations or investment in VPE's may be dependent on the agreement it's the VPE has with its membership or subscription service. For example a mandatory VPE guarantees that it will not remove itself from the transaction space and may increase in popularity as it transact or guarantor value are or in investment attractor based on the fact that it is always available or home researchable. On the other hand, if the owner or host of the VPE, that is based on a mandatory participation removes it from the grid (during a time of economic panic, for example), the subscription service may classify that VPE as "SA" (voluntary participation may accrue other types of benefits or penalties) and/or suffer the consequences of changing its status. In fact, a feature of the VPE invention in one embodiment, is to guarantee the value and status of all associated or members VPEs/mVPEs, and a host or association can punish them (via contract or electronic default or other means) or terminate them accordingly, if they do not comply.

Figure 17A:
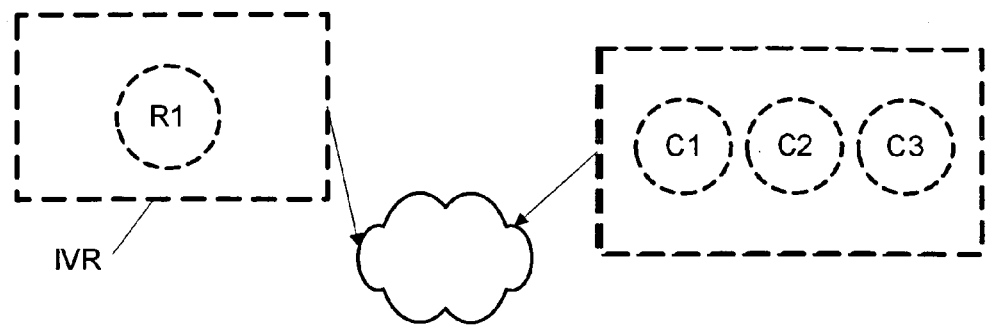
FIG. 17A illustrates a configuration of the investment attraction mode with a reference valuator internal to a investment module.
Figure 17B:
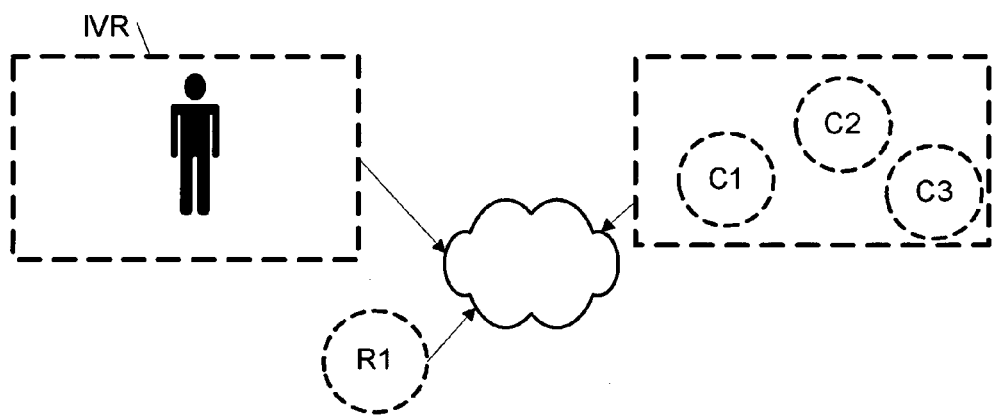
FIG. 17B illustrates a configuration of the investment attraction mode with a reference valuator external to a investment module.

The VPE as shown in FIGS. 17A and B and may consist of a few virtual parts or components. For example, one of the parts may include a key either in the form all a data code segment data stored or a password or both and the portion on a networked transaction space TS a VPE in the transaction spit I lots if we code segment is not present either through a network or physically attached to the complete computation device says that house the VPE automatically be done to VPE is not participating or asylum not activated.

The attraction mode shown in FIGS. 16-19, allows an individual (or group) who may have highly intangible dynamically valuable assets who may not wish to auction them directly or seeks to capitalize on the potential value may attract investment when indexing was the only available option prior to the invention. Thus, the free-market in the virtual personal economy in the attraction mode is based on investment of an equal nature.

Figure 18:
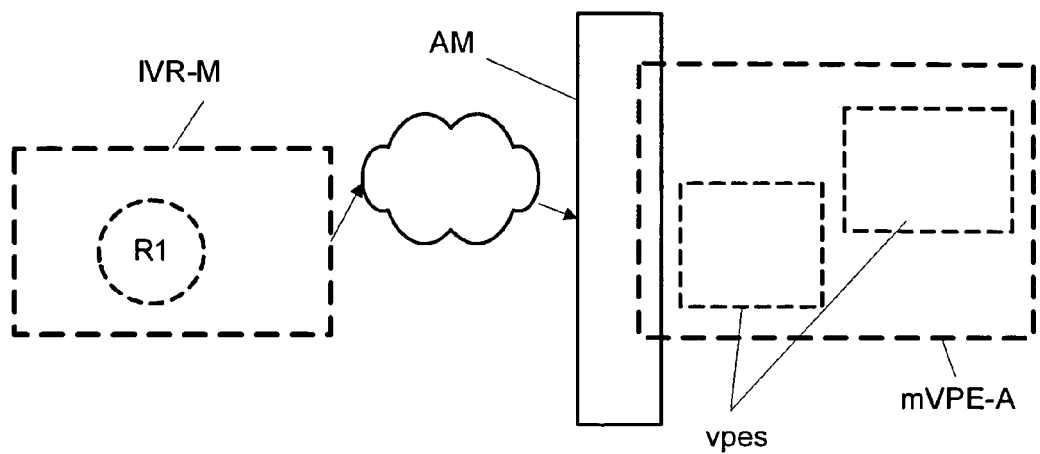
FIG. 18 shows an investment attraction mode of the present invention with a authentication module.
Figure 19:
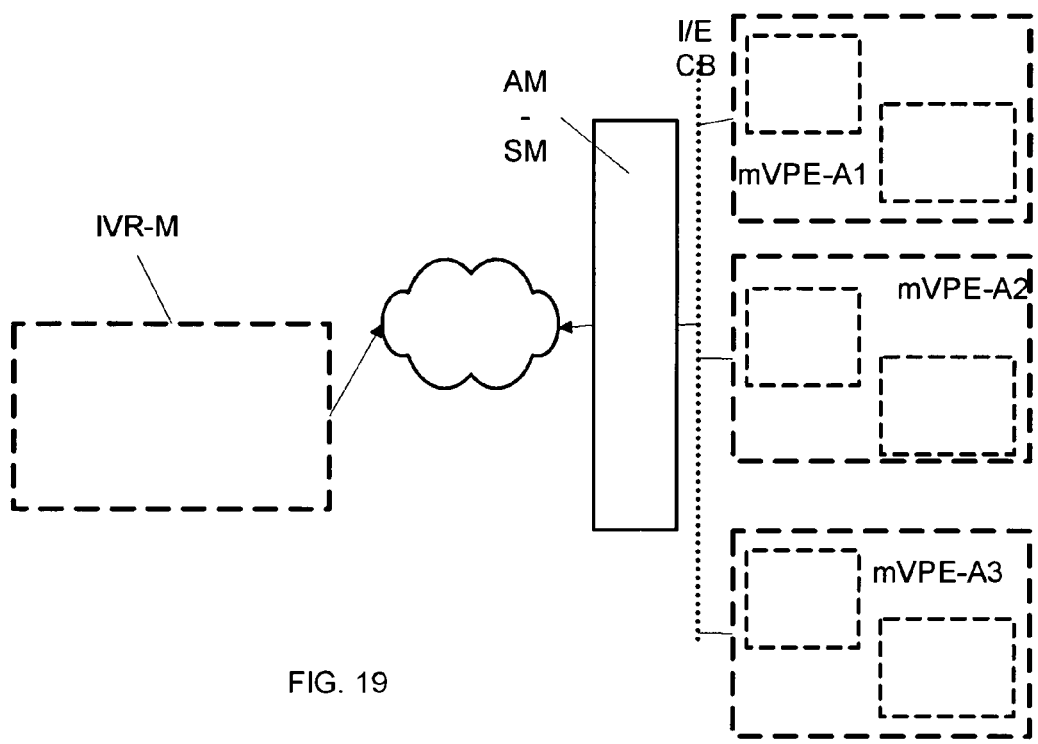
FIG. 19 illustrates the investment attraction mode of the invention with a subscription and mVPE selection module.

FIG. 18 shows an attractor mode embodiment of the invention with the authentication module AM. In attempting to find VPE or mVPE's, investors with the seeker may recognize the authentication module AM as protecting the investment or at authenticating the asset identifications. In the preferred embodiment of this particular mode, the services are either subscription membership or pay-per-use (see also FIG. 19) similar to that discussed above in FIGS. 13 and 14, are contemplated to attract their own investor (or transactors) and be their own business model and stream of income. Such an authentication would be similar to the virtual Moody's rating system go for that a VPE is it invites higher risk and hire reward. Costs the only the EPA rating system in which responses tend to be driven by extreme responses GT very happy or very upside there may be a more comprehensive evaluation all of the stability of the VPE and shown in FIG. 18. The AMs may rely on their adherence to their own promulgated standards which may be used in determining there were found as an entire investment attraction and FIG. 19, in which the investors can select from an attraction membership mVPE-A1-mVPE-A3.

Referring now to FIGS. 17A and B, the system implementing the attraction mode VPE-As may achieve standardization or normalization or a particular transaction or reference valuation, R1, which may be internally referenced (FIG. 17A) or externally referenced (FIG. 17B) such as subscription service or a pool of similar investing entities. For example, dealers in heavy equipment industrial equipment may wish to exchange for a certain type of commodity or it types of commodities host VPEs that do well in facilitating the transactions and or maintaining exciting guarantees for failed transactions may achieve a particularly uniform level valuation for particular asset classes. For example, it may be the case in a particular situation that heavy machinery, such as industrial machinery is tied or linked to the perceived value (or inversely tied) to another commodity, that is also related to a contingency or identifier of industrial activity in that sector, such as employment or unemployment starts. Thus, the commodity or asset that would be tied to that specific identifier, such as liquor store values, would result in heavy machinery values rise when demand for liquor stores decreases, resulting in an inverse correlation.

Figures 20A, 20B, 20C:
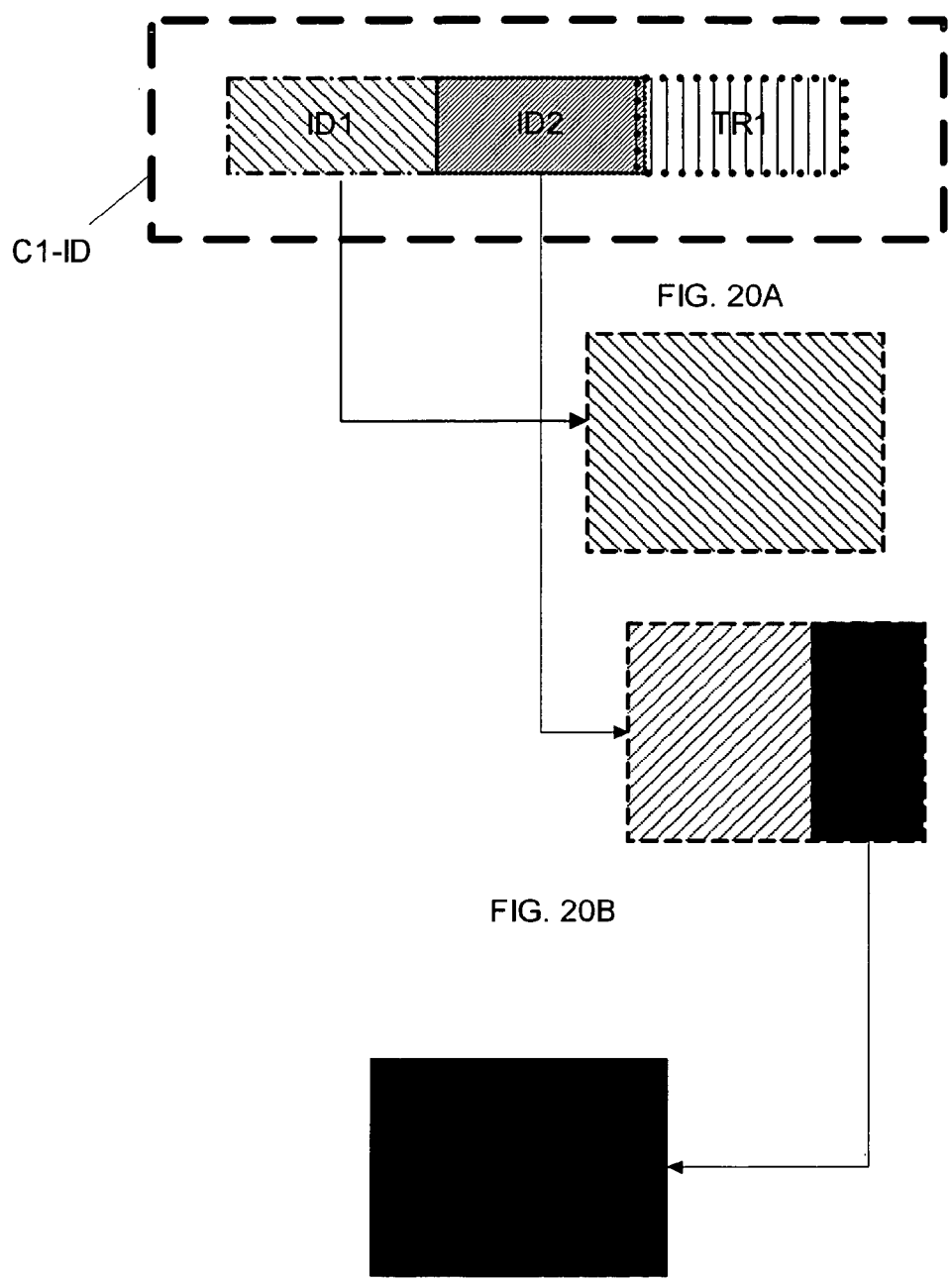
FIG. 20A illustrates the asset identification system.
FIG. 20B illustrates the asset identification and classification system from a more detailed view.
FIG. 20C illustrates the anonymous part of the asset identification and classification system and the transactional history part of the asset identification system.

Referring now to FIGS. 20A and B, a sample asset identification system is shown with both publicly identifying and anonymous features. Part of the "asset description" is broken down among into a narrowing series of categories which may be considered parallel to biological taxonomies, e.g., kingdom, phylum, family genus, species, subspecies, etc. A sample table off a classification system along these lines is shown below. For example tangible commodities would be the equivalent of a family the genus may include precious metals the species would include platinum subspecies would include a parade of platinum. In FIG. 20A, a representation of an optional unique assets identification system is shown. The identification system is robust enough to create both a public and private knowledge simultaneously. Using the identification system of the present invention in a preferred embodiment, allows a third-party to know enough about the asset for verification or initial evaluation and maintains security and anonymity, such that the asset holder AH or mVPE retains its privacy.

| Asset | Type (3) | Family | Class | Species | Subspecies |
|---|---|---|---|---|---|
| C1-Real Estate | Tangible (1) | Real Estate | Fee Simple | Zone Commercial | Urban-New York 2006 |
| C2-Soy Futures | Futures(3) | Commodity (1) | Agriculture | Soy | |
| C3-Collector Watches | Tang (1) | Personal (4) | Jewelry | Watches | Brand |
| C4-keyword rights | Intangible (2) | Information Advert. | — | — | — |
| C5-equities | Tang(1) | Pub Trad. Eq. | NASDAQ | GDUE | — |

The asset ID system includes at least two classes of identifier, each of which has several subsidiary identifiers. The main classes are shown as ID1 one ID2, and TR1. TR1 is a reconfigurable tracking identifier that dynamically changes based on the number of variables including ownership, contingent market conditions (for dynamic asset classes), liens, and other dynamic factors discussed below. FIG. 20B shows the sample components of each of the two identifiers. In ID1, there is a tangible/intangible identifier ID1-T/ID1-I, and sold—identifier of the type of asset, such as commodity, real estate, futures, contingent information, etc.

The asset classification and identification system therefore becomes useful upon contemplating any of the modes of the VPEs. The universal classification system of assets allows them to be identified along several important parameters and implemented anonymously through computer networks. Certainly, the ID may not always be possible to hide the true nature of every anonymous feature of each asset, but the VPEs need not have assets with unique or anonymous IDs to be identified directly either, but may implement such a feature in a preferred embodiment.

An additional series of identifications may help to implement the present invention in particular embodiments. Such identification data may include the situation in which the asset is a future right or a dynamic right, locates present ownership of co-ownership of and a series of empty fields that generate that change due to their use of the asset. As an illustration, consider the three groups of information for the identification system the first is a rigid taxonomy based on the nature of the asset. The second is a descriptive taxonomy based on the particulars all of that assets. So the information contained in the second category of information will change depending on the taxonomy of the asset for example tangible commodities in possession or right of possession to not need information on dynamic pricing or valuation concerns at exchange.

It may be necessary to know the manner in which a right was acquired through the transaction history as shown in FIG. 20C. However in certain situations, TR data may be included or imported in the ID1 and ID2 asset data. For example, if a right, such as a contract right to purchase a commodity, depends on the owner's status, or other factor, such as a preferred provider, vendor size, or competitor, the tracking identification data TR or third data category, is data that is related or contained in the history of the asset as opposed to its taxonomies, like the data in ID1 and ID2. It is contemplated that the critical value-dependent information will normal be in the second and first groups and the security and verification information will be the "publicly inspect-able" TR data group. In summary, some TR data may be included as ID1 and ID2 groups, if it has affected the value of the asset like the other asset DNA. For example, rights holders and intellectual property may have been equally undivided interests and a work or invention's total ownership will significantly affect the value to a consumer or investor who was not purchasing for the rights bought for value but for access to the right.

Figure 21:
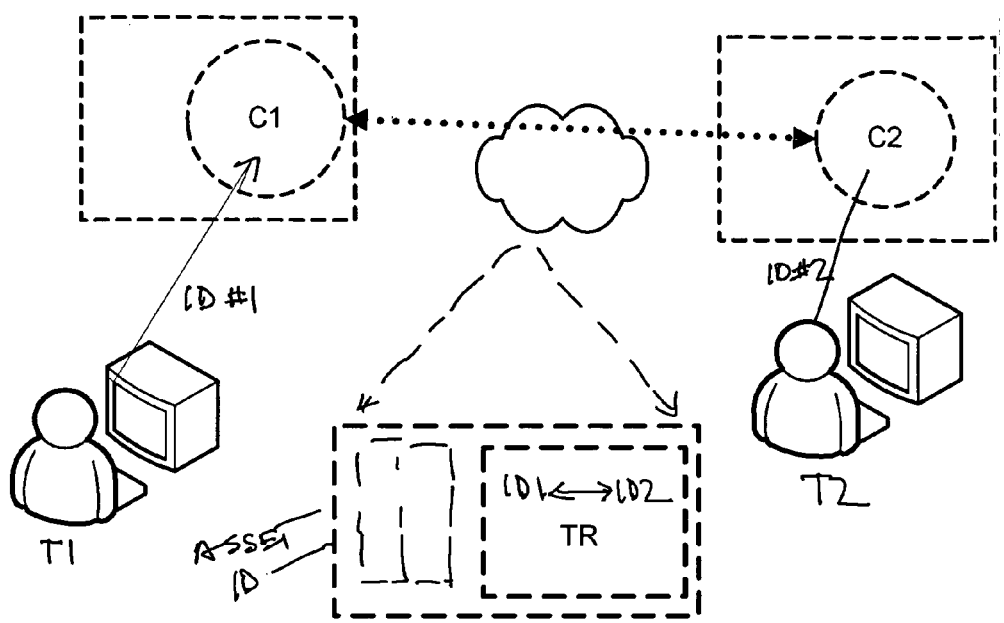
FIG. 21 illustrates the implementation of the TR part of the asset identification system in a transaction.

Referring now to FIG. 21, an example of the TR data in the unique asset ID system is shown. In FIG. 21, the transaction between TR1 and TR2 allows the asset associated with the transaction to replace the ID of each transactor.

Figure 22:
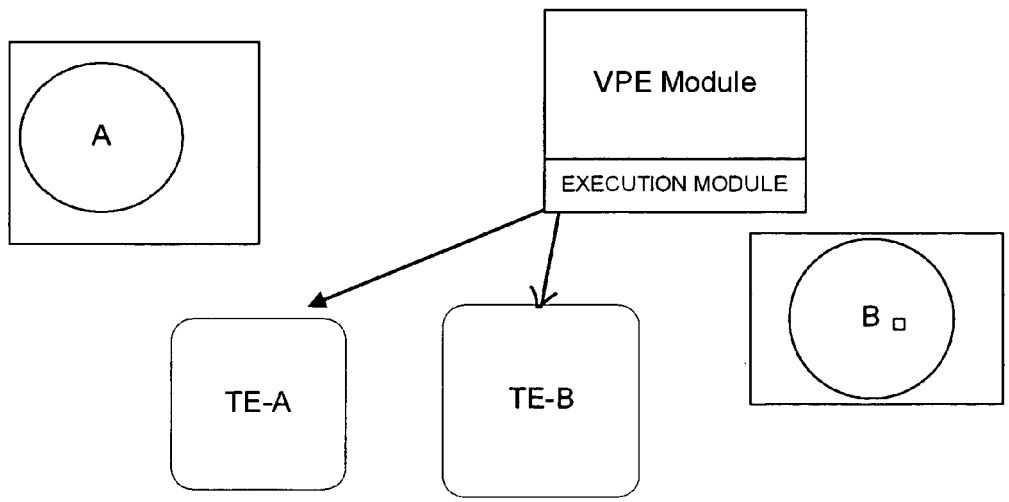
FIG. 22 illustrates a first configuration of an alternate embodiment in which the virtual personal economies are used to generate, secure and exchange shares in an entity.
Figure 23:
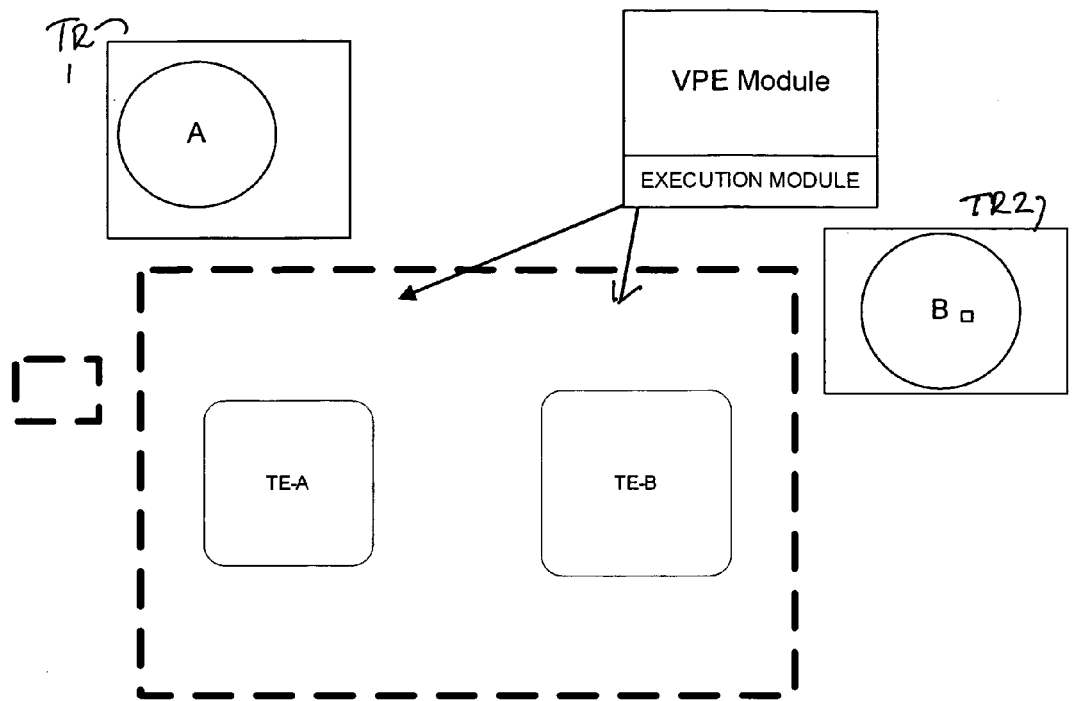
FIG. 23 is a second stage of the configuration of the share-exchange enhanced mode in which the stock is correlated to each other before exchange.
Figure 24:
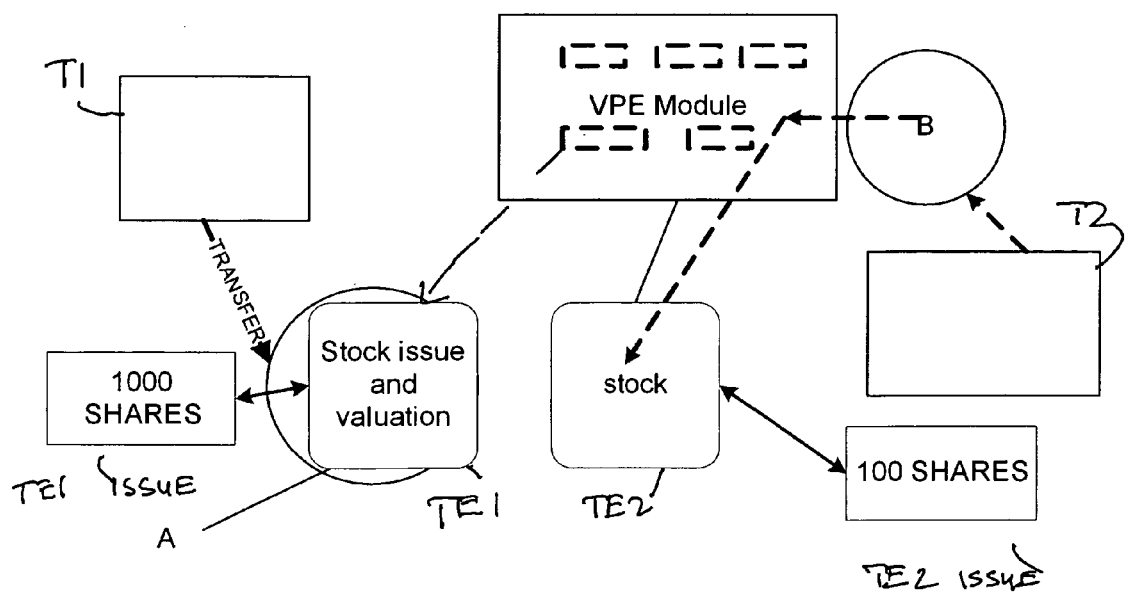
FIG. 24 shows the transaction of the share-exchange enhanced mode.

Asset prior to transactions ID1 ID2
Including anonymous TR (part 1)
Transaction Prior TR (part 2)
Current Ownership
Asset 1 A-B-C-D-E F-G-H [I-J] Exchanged for X2, on 4-5-02, by D2, etc. T1, date, status (full and unencumbered)
Asset 2 1-2-3-4-5 6-7-8-[9-10] Generated by T2 and registered on 3-4-00 T2, date registered (no encumbrances), value linked to R1 on 4-5-04
Asset after transactions
Asset1 A-B-C-D-E F-G-H [I-J] Exchanged for A2 (link), transferred from TR1, date T2, date, etc.
Asset2 1-2-3-4-5 6-7-8-X-[9-10] Exchanged for A1 (link), transferred from TR2, date T2, date registered (no encumbrances), value de-linked to R1 on date FIGS. 22-24 show the present invention in an enhanced asset exchange mode, in which special types of transaction are completed as described above with specific "stock-exchange" or "swap" financial advantages. Referring now to FIG. 22, an enhanced transaction mode of the invention is shown. Initially, the enhanced exchange mode is configured similarly to the valuation and securitization embodiment discussed above.

Referring now to FIG. 23, the execution module is instructed by a standing set of instructions (rule base) or specifically from one or more of the participants in the transaction to create a number of "transactional entities" or TEs. The assets to be exchanged are valuated and secured through the VPE/mVPE which controls and directs the creation of the TEs through the instructions of the transactors. Referring now to FIG. 24, a completed preferred transaction with the TE system is shown. The valuation of asset A is tied to the stock (based on the shareholder approval) of 1000 shares in the TE1, as is the stock of TE2 (100 shares) tied to the asset B (from TR2) which passes through the VPE system to the TE2. The VPE system can then make sure the assets A and B are valuated properly by stock means. There will be no need to refer to any currencies (as discussed above in the other embodiments) as the stock of TE1 and TE2 is specifically tied to the VPE/mVPE and then correlated via a valuation module (see FIGS. 12-14) to the respective exchanged assets.

The advantages of swapping the VPE valuated stock in the TEs are numerous, but are mainly to facilitate cross-border transactions without the transaction reporting requirements. FIGS. 22-25 illustrate that assets can be exchanged through this embodiment of the present invention with the exchange of general issue or special issue stock which then can be exchanged. Using this system, only the reporting and accounting requirements of the governing jurisdiction is required.

Figure 25:
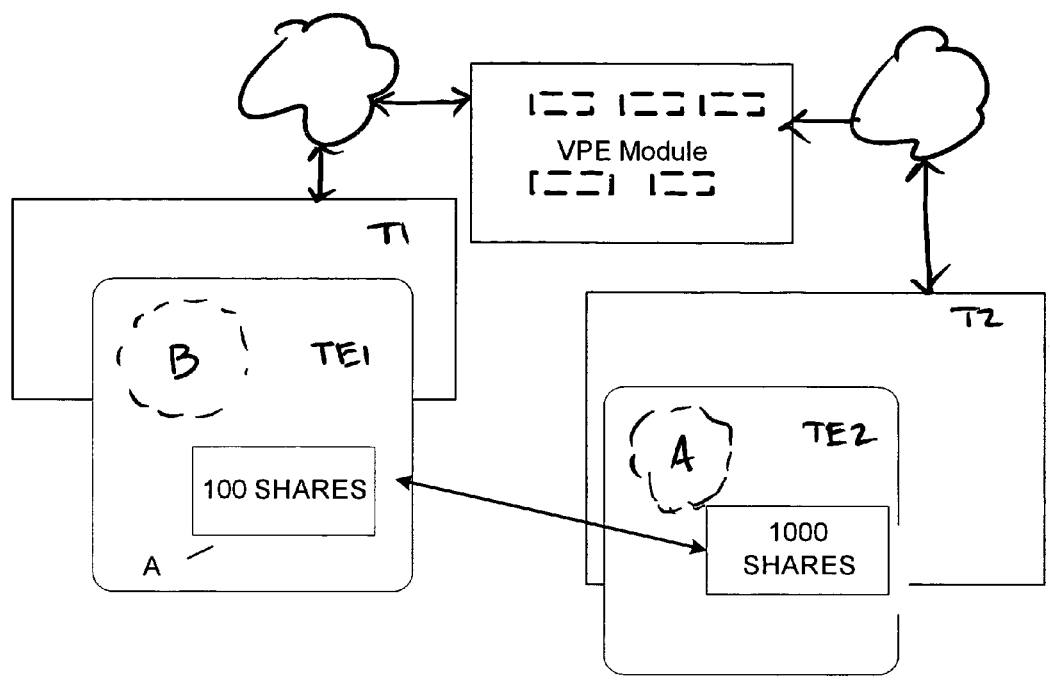
FIG. 25 shows an embodiment of the present invention after an exchange of stock in the enhanced mode.

Shown in FIG. 25 are the TE management modules MM. Ideally, the TEs are "stored" or dormant "shelf" corporations in tax-advantaged locations (without running afoul of any tax or corporate laws) that are under the control of the execution module EM through the rule base in the MM. Although, it is odd to consider that a computer program would be creating and running a corporation, the EM is simply implementing instructions that It is to be expected that in this particular embodiment that for 24-hour implementation that the VPE running an EM with entity management modules MM would need to have supervised monitoring from competent personnel MP who can submit their approval when the situation is appropriate.

One of the advantages of the present invention in the enhanced mode is that the trading entities can give themselves tax advantages that would otherwise be unavailable unless lengthy and expensive (at least for the cost of the delayed transaction) measures were to be taken. The services involved in those lengthy and expensive can be consolidated into a single series of executable steps that may require certain authenticating measures. However, to comply with all state and federal regulations, the reporting of the transaction details would also be automated or regulated.

The above embodiments have been mentioned or described above for illustrative purposes, and the actual scope of the invention will include other examples it they're not specifically discussed here. For example, the transactional space may be public, semi-private (e.g. AOL) or private (e.g. subscription, invitation-only, pay-per-use depending on the needs of the virtual personal economy system and its goals. VPE's that are members of the same host, may all be part of the meta-VPEs and be physically located on one computational system seamlessly, or with appropriate partitions, and always appropriately backed up at regular intervals. The modes for using the VPEs may be implemented across a network of systems by an association identifying and regulating VPE systems, such as a nonprofit standards organization.

The invention is primarily driven by the exchange and linking of traditional assets and other types of personally held commodities (collectively assets), so that they may be put to use in the most effective manner in the economy without the traditional economic risks or burdens. These assets are held (representationally) by individuals (as persons or in corporate) and mapped to the virtual personal economy representation. The assets may be identified in different ways, but in the spirit of the invention, will generally be described and values independently off a government-driven or valued economy, such as the unique asset ID system (asset DNA) disclosed above.

The invention claimed is:

1. A system implemented by one or more computational devices for conducting a securitized transaction between a selling party and a purchasing party and a securitor, over a network comprising:
  a data storage device, said data storage device including electronic representations of at least one set of owned assets, wherein said at least one set of owned assets includes assets other than currency;
  a module for verifying that said at least one set of owned assets are other than currency;
  a module executing a set of instructions to map an outside asset or commodity for sale to said at least one set of owned assets;
  an operative connection to both a first electronic agent looking to dispose of said outside asset or commodity (seller) and a second electronic agent looking to secure said outside asset or commodity (securitor) in exchange for an asset or commodity other than currency, an exchange module capable of securing a transaction of said outside asset or commodity for sale;
  said securing at least accomplished by providing at least a portion of said at least one set of owned assets as security for said exchange, wherein said exchange module obtains approval from said second electronic agent via said network to use said at least one set of owned assets as security for said exchange, before said exchange occurs.

2. A method for generating an investment pool comprising the steps of:

cataloging a first set of one or more assets and configuring said catalog of assets into electronic form, said electronic form including electronic representation on one or more networked computational devices including removable and secure data storage;

verifying through a set of executable instructions on one or more said computational devices that said catalog of assets is not currency;

allowing through a set of executable instructions on said one or more networked computational devices for said electronic first asset set catalog to be inspected over a network;

when selected by an outside source connected to said one or more networked computational devices, executing instructions on said first one or more networked computational devices for linking a second set of assets represented in electronic form to said first set and verifying that said second set of assets represented in electronic form is not currency such that:

the owner of said second set of assets has correlated the value of said second set of assets to said first set of assets with a normalization constant;

wherein any number of asset types may be added to correlate to said first set of assets, and whereby said first set of assets has a non-currency investment value.

3. The method as recited in claim 2 further including the step of executing instructions on said first one or more networked computational devices for correlating said first set of assets and said second set of assets to a reference value.

4. The method as recited in claim 3 further including the step of executing instructions on an outside networked computational device for correlating said first set of assets and said second set of assets to a reference value.

5. The method as recited in claim 3 wherein said reference value is not located on the same host system that includes access to said second set of assets.

6. An improved investment system comprising:

a computational device linked to a network through set of executable instructions on said computational device linked to a network that implements a screening system;

electronic data storage configured to store first data that represents a first asset;

said executable instructions on said computational device including a filter that verifies that said first asset does not include any relationship to currency;

a verification system with instructions executed on said computational device that is configured to verify the existence and identification of said first asset represented by said first data after said executable instructions have verified that said first asset does not include any relationship to currency;

wherein verification instructions executed on said computational device loads said first data representational of said first asset in response to a request received over said network and through said screening system and correlates said first data representational of said first asset to a set of second data that is representational of a second non-currency asset based on a valuation of said first and second data representational of said respective first and second asset;

wherein asset valuation is based on the configuration of said first and second asset;

and said verification instructions executed on said computational device confirms that both said sets of data are properly correlated to said respective assets.

* * * * *